(12) United States Patent
Chen et al.

(10) Patent No.: US 12,270,505 B2
(45) Date of Patent: Apr. 8, 2025

(54) ANGLE ADJUSTMENT APPARATUS

(71) Applicant: HUAWEI TECHNOLOGIES CO., LTD., Guangdong (CN)

(72) Inventors: Wei Chen, Dongguan (CN); Shiyan Hu, Dongguan (CN); Chenglong Wang, Shenzhen (CN); Linlin Yang, Dongguan (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 18/154,272

(22) Filed: Jan. 13, 2023

(65) Prior Publication Data

US 2023/0160520 A1 May 25, 2023

Related U.S. Application Data

(63) Continuation of application No. PCT/CN2021/095319, filed on May 21, 2021.

(30) Foreign Application Priority Data

Jul. 15, 2020 (CN) .......................... 202010678420.0

(51) Int. Cl.
*F16M 11/14* (2006.01)
*F16C 11/10* (2006.01)

(52) U.S. Cl.
CPC ........... *F16M 11/14* (2013.01); *F16C 11/106* (2013.01); *F16M 2200/022* (2013.01)

(58) Field of Classification Search
CPC ............. F16M 11/14; F16M 2200/022; F16M 11/126; F16M 11/123; F16C 11/106; Y02E 10/50

USPC .................................................... 248/288.31
See application file for complete search history.

(56) References Cited

U.S. PATENT DOCUMENTS

| | | | | |
|---|---|---|---|---|
| 4,632,348 A * | 12/1986 | Keesling | ............. | F16C 11/0619 248/222.52 |
| 4,980,805 A * | 12/1990 | Maglica | ................. | F16M 11/14 403/141 |
| 7,594,823 B2 * | 9/2009 | Moscovitch | ........... | F16M 13/00 248/917 |
| 8,177,178 B2 * | 5/2012 | Carnevali | .......... | F16M 11/2078 248/223.41 |

(Continued)

FOREIGN PATENT DOCUMENTS

| | | |
|---|---|---|
| CN | 201753825 U | 3/2011 |
| CN | 103684479 A | 3/2014 |

(Continued)

*Primary Examiner* — Muhammad Ijaz
(74) *Attorney, Agent, or Firm* — WOMBLE BOND DICKINSON (US) LLP

(57) ABSTRACT

An angle adjustment apparatus is provided, and includes a fastening component and an angle adjustment component rotatably connected to the fastening component. At least a part of the angle adjustment component is located in the fastening component, and the angle adjustment component can rotate in a horizontal direction and a vertical direction relative to the fastening component. In this way, angle adjustment efficiency is improved. In addition, a communication device can be prevented from being oblique after angle adjustment, thereby preventing a signal coverage function of the communication device from being affected.

15 Claims, 12 Drawing Sheets

(56) References Cited

U.S. PATENT DOCUMENTS

| | | | |
|---|---|---|---|
| 8,366,064 B2* | 2/2013 | Chen | F16M 13/02 403/56 |
| 2005/0092873 A1* | 5/2005 | Lin | F16M 11/2078 248/125.9 |
| 2008/0232044 A1* | 9/2008 | Moscovitch | F16M 11/041 361/679.04 |
| 2011/0095159 A1* | 4/2011 | Carnevali | F16M 11/14 248/372.1 |
| 2011/0318093 A1* | 12/2011 | Liao | F16M 11/041 403/142 |
| 2013/0105644 A1* | 5/2013 | Yu | F16M 11/14 248/125.7 |
| 2014/0321902 A1* | 10/2014 | Taptic | H01Q 1/1214 403/90 |
| 2016/0285411 A1* | 9/2016 | Kirk | F24S 30/45 |
| 2019/0113072 A1* | 4/2019 | Chijoff | F16C 11/0609 |
| 2022/0063513 A1* | 3/2022 | Grant | B60R 11/0258 |
| 2023/0160418 A1* | 5/2023 | Lin | F16C 11/106 248/288.31 |
| 2023/0160520 A1* | 5/2023 | Chen | F16M 11/14 248/288.31 |
| 2023/0175637 A1* | 6/2023 | Mazur | F16C 11/0647 248/127 |
| 2023/0400142 A1* | 12/2023 | Zeng | F16M 13/022 |

FOREIGN PATENT DOCUMENTS

| | | |
|---|---|---|
| CN | 105378366 A | 3/2016 |
| CN | 105589506 A | 5/2016 |
| CN | 205579093 U | 9/2016 |
| CN | 108183311 A | 6/2018 |
| CN | 210266528 U | 4/2020 |
| CN | 112066204 A | 12/2020 |
| JP | H07212630 A | 8/1995 |
| JP | 3055482 U | 1/1999 |
| JP | 2008089088 A | 4/2008 |
| TW | I635237 B | 9/2018 |

* cited by examiner

ANGLE ADJUSTMENT APPARATUS

CROSS-REFERENCE TO RELATED APPLICATIONS

This application is a continuation of International Application No. PCT/CN2021/095319, filed on May 21, 2021, which claims priority to Chinese Patent Application No. 202010678420.0, filed on Jul. 15, 2020. The disclosures of the aforementioned applications are hereby incorporated by reference in their entireties.

TECHNICAL FIELD

Embodiments of this application relate to the field of mechanical assembly technologies, and in particular, to an angle adjustment apparatus.

BACKGROUND

With continuous development of science and technologies, a large quantity of communications devices (such as a wireless communications remote-control transmit unit, a base station, and an antenna) all need to be fastened to various mounting environments by using brackets. Due to a function requirement such as signal coverage, some devices further have a requirement that an oblique angle and a horizontal rotation angle can be adjusted. In view of this, a current common solution is fastening a communications device to a mounting carrier (such as a pole or a wall) by using a mounting mechanism that can implement angle adjustment, and then implementing mounting of the communications device at different angles by using an angle adjustment function of the mounting mechanism.

In the conventional technology, a mounting mechanism used for device mounting usually includes a fastener, an intermediate member, and a device fastener. The fastener is configured to fasten a multi-functional mounting bracket. The intermediate member is configured to adjust a device mounting direction. The device fastener is configured to fasten a device. The intermediate member is connected to the fastener by using a horizontal adjustment mechanism or a vertical adjustment mechanism, and the device fastener is connected to the intermediate member by using a vertical adjustment mechanism or a horizontal adjustment mechanism, so that the mounting mechanism used for device mounting can support angle adjustment positioning in both a horizontal direction and a vertical direction.

However, angle adjustment efficiency of the mounting mechanism is low, and the device is prone to be oblique after angle adjustment, affecting a signal coverage function of the device.

SUMMARY

This application provides an angle adjustment apparatus, to improve angle adjustment efficiency, and also prevent a device from being oblique after angle adjustment, thereby preventing a signal coverage function of the device from being affected.

This application provides an angle adjustment apparatus, including a fastening component and an angle adjustment component rotatably connected to the fastening component.

At least a part of the angle adjustment component is located in the fastening component, and the angle adjustment component can rotate in a horizontal direction and a vertical direction relative to the fastening component.

According to the angle adjustment apparatus provided in an embodiment of the application, at least the part of the angle adjustment component is located in the fastening component, and the angle adjustment component can rotate in the horizontal direction and the vertical direction relative to the fastening component, so that an angle adjustment function in the horizontal direction and an angle adjustment function in the vertical direction are integrated into a same component. In this way, the angle adjustment apparatus greatly improves angle adjustment efficiency. In addition, because a rotation axis in the horizontal direction and a rotation axis in the vertical direction of the angle adjustment apparatus are located on a same plane, a device can be prevented from being oblique after angle adjustment, thereby preventing a signal coverage function of the device from being affected. Furthermore, a distance that is from the device to a wall or a pole and that is obtained after mounting can be greatly reduced, thereby greatly improving device mounting convenience and beauty obtained after the mounting, and supporting fast mounting and deployment of the communications device. Therefore, the angle adjustment apparatus provided in an embodiment of the application can improve angle adjustment efficiency, and also prevent a device from being oblique after angle adjustment, thereby preventing a signal coverage function of the device from being affected.

In an embodiment, the fastening component includes a first fastener and a second fastener. The first fastener has a first groove body, the second fastener has a second groove body, and at least the part of the angle adjustment component is located in an accommodation cavity formed by the first groove body and the second groove body.

At least the part of the angle adjustment component is located in the accommodation cavity formed by the first groove body of the first fastener and the second groove body of the second fastener, so that an angle adjustment function in the horizontal direction and an angle adjustment function in the vertical direction can be integrated into a same component. In this way, angle adjustment efficiency is greatly improved.

In an embodiment, the angle adjustment component includes a support member and a rotation member fixedly connected to the support member. The rotation member is located in the accommodation cavity, and the rotation member can rotate in the horizontal direction relative to the first fastener and the second fastener.

The rotation member of the angle adjustment component is located in the accommodation cavity formed by the first groove body of the first fastener and the second groove body of the second fastener, so that an angle adjustment function in the horizontal direction and an angle adjustment function in the vertical direction can be integrated into a same component. In this way, angle adjustment efficiency is greatly improved.

In an embodiment, the first groove body includes a first rotation groove and first chutes located on two sides of the first rotation groove, and the second groove body includes a second rotation groove and second chutes located on two sides of the second rotation groove. The rotation member includes a rotation part and linkage parts located on two sides of the rotation part. The rotation part is located in a first accommodation cavity formed by the first rotation groove and the second rotation groove, and the linkage parts are located in second accommodation cavities formed by the first chutes and the second chutes.

In this way, the rotation part is located in the first accommodation cavity formed by the first rotation groove and the second rotation groove, and the linkage parts are located in the second accommodation cavities formed by the first chutes and the second chutes. The first chutes and the second chutes can limit moving ranges of the linkage parts, to limit a rotation range of the angle adjustment component in the horizontal direction relative to the fastening component.

In an embodiment, the angle adjustment apparatus further includes a positioning member. The rotation part has a first through hole extending in a length direction of the positioning member, and an inner wall of the first through hole has an oblique arc surface. The positioning member is located in the first through hole, and when the rotation member rotates in the vertical direction relative to the positioning member, the oblique arc surface is used to limit a rotation range of the rotation member.

The positioning member is disposed, so that a pressure change of a contact surface can be implemented, thereby affecting contact friction, to implement immediate positioning and locking in an angle adjustment process.

In an embodiment, the rotation part is of a spherical structure. The rotation part can implement fusion of horizontal and vertical bidirectional angle adjustment axes.

In an embodiment, the support member includes a support plate and ring arms fixedly connected to two sides of the support plate. The ring arms are connected to the linkage parts in the rotation member.

After the rotation member of the angle adjustment component is embedded in the first groove body of the first fastener and the second groove body of the second fastener in the fastening component, the ring arms surround the periphery of the first fastener and the second fastener, so that rotation flexibility of the angle adjustment component relative to the fastening component can be ensured when the angle adjustment apparatus experiences an abnormal scenario such as severe impact and tearing.

In an embodiment, the first fastener includes a first fastening part and a first connection part, at least one first mounting hole is disposed in the first fastening part, there is a concave part on a side that is of the first fastening part and that faces away from the first connection part, and the concave part has a toothed structure. The second fastener includes a second fastening part and a second connection part, at least one second mounting hole is disposed in the second fastening part, there is a concave part on a side that is of the second fastening part and that faces away from the second connection part, and the concave part has a toothed structure. The first groove body is located on the first connection part, and the second groove body is located on the second connection part.

In this way, the first mounting hole and the second mounting hole can fasten the fastening component (the first fastener and the second fastener) to a plane such as a wall, to cooperate with a steel belt, a hose clamp, an expansion bolt, or the like to implement reliable mounting of pole holding and wall hanging. The concave parts can further ensure stability of fastening of the fastening component to a pole-shaped fastening apparatus, and increase a contact area between the fastening component and the pole-shaped fastening apparatus. The toothed structures can increase contact friction between the fastening component and the pole-shaped fastening apparatus.

In an embodiment, a second through hole through which the positioning member can be penetrated is disposed on each of a groove bottom of the first rotation groove and a groove bottom of the second rotation groove.

In this way, the positioning member may be sequentially penetrated through a second through hole located in the first fastener, the first through hole located in the angle adjustment component, and a second through hole located in the second fastener, to implement fastening and connection between the fastening component and the angle adjustment component.

In an embodiment, the first fastener further includes a first transition part located between the first fastening part and the first connection part, and a first step is formed between the first transition part and the first connection part. The second fastener further includes a second transition part located between the second fastening part and the second connection part, and a second step is formed between the second transition part and the second connection part.

The first step is formed between the first transition part and the first connection part of the first fastener, and the second step is formed between the second transition part and the second connection part of the second fastener. Therefore, when the first fastener and the second fastener are assembled into the fastening component, the first transition part fits with the second transition part, and a gap is formed between the first connection part and the second connection part. The gap can reserve adjustment space for accommodating the rotation member in the accommodation cavity formed by the first groove body and the second groove body, to improve matchability and versatility during mounting of the fastening component to the angle adjustment component. In addition, disposition of step positions (the first step and the second step) can further improve a spherical hinge holding force obtained after assembly.

In an embodiment, at least one third through hole is disposed in each of the first transition part and the second transition part, and at least one fourth through hole is disposed on each of one end that is of the first connection part and that is away from the first transition part and one end that is of the second connection part and that is away from the second transition part.

In this way, the first fastener and the second fastener may be pre-fastened by penetrating a first stud through a third through hole in the first transition part and a third through hole in the second transition part; or the first fastener and the second fastener may be pre-fastened by penetrating a second stud through a fourth through hole on the end that is of the first connection part and that is away from the first transition part and a fourth through hole on the end that is of the second connection part and that is away from the second transition part.

In an embodiment, at least one convex point is disposed on one of the first transition part and the second transition part, at least one concave hole is disposed on the other of the first transition part and the second transition part, and the convex point is cooperatively connected to the concave hole; or at least one convex point and at least one concave hole are disposed on one of the first transition part and the second transition part, and at least one concave hole and at least one convex point are disposed on the other of the first transition part and the second transition part. A convex point on the first transition part is cooperatively connected to a concave hole on the second transition part, and a concave hole on the first transition part is cooperatively connected to a convex point on the second transition part.

The convex point is in a one-to-one correspondence with and cooperatively connected to the concave hole, so that accurate positioning during mounting of the first fastener to the second fastener can be further ensured.

In an embodiment, a horizontal adjustment angle scale identifier is disposed at a position at which an outer edge of the first connection part is close to the linkage part or at a position at which an outer edge of the second connection part is close to the linkage part. A vertical adjustment angle scale identifier is disposed at a position at which the linkage part of the rotation member is exposed from the first connection part or the second connection part.

In this way, when the angle adjustment component is rotated in the horizontal direction relative to the fastening component, the horizontal adjustment angle scale identifier may be used to display a rotation angle of the angle adjustment component in the horizontal direction relative to the fastening component, to indicate a magnitude of an adjustment angle in the horizontal direction. When the angle adjustment component is rotated in the vertical direction relative to the fastening component, the vertical adjustment angle scale identifier may be used to display a rotation angle of the angle adjustment component in the vertical direction relative to the fastening component, to indicate a magnitude of an adjustment angle in the vertical direction. In addition, in an angle adjustment process, an angle adjustment position in the horizontal direction and an angle adjustment position in the vertical direction can be determined at one time based on a scale at a position at which the first connection part is closest to the linkage part or based on a scale at a position at which the second connection part is closest to the linkage part.

In an embodiment, the angle adjustment apparatus further includes an adapter component. The adapter component is located on a side that is of the angle adjustment component and that is away from the fastening component, and the adapter component is detachably connected to the angle adjustment component.

In an embodiment, the adapter component is connected to the angle adjustment component by using a dovetail structure. The dovetail structure includes a male dovetail and a female dovetail, where one of the male dovetail and the female dovetail is disposed on the adapter component, and the other of the male dovetail and the female dovetail is disposed on the angle adjustment component. The male dovetail is cooperatively connected to the female dovetail.

Fast deployment mounting and locking of the adapter component to the angle adjustment component can be implemented by disposing the dovetail structure.

In an embodiment, the adapter component includes an adapter board. The male dovetail or the female dovetail is disposed on a side that is of the adapter board and that faces the angle adjustment component. A handle and a mounting interface used to connect to an external device are further disposed on the adapter board.

Disposition of the handle can facilitate holding and lifting of an operator for the adapter board, and the mounting interface is disposed to correspond to a side interface of the external device, to implement fast mounting connection between the adapter board and the external device.

With reference to the accompanying drawings, these and other aspects, implementations, and advantages of example embodiments become apparent from embodiments described below. However, it should be understood that the specification and the accompanying drawings are merely intended to illustrate embodiments of this application and are not intended to be defined as limitations on embodiments of this application. For details, refer to the appended claims. Other aspects and advantages of embodiments of this application are set forth in the following descriptions and are partially apparent from the descriptions, or are learned from practice of embodiments of this application. In addition, aspects and advantages of embodiments of this application may be implemented and obtained by using means and combinations noted in the appended claims.

DESCRIPTION OF REFERENCE SIGNS

Figure 1:
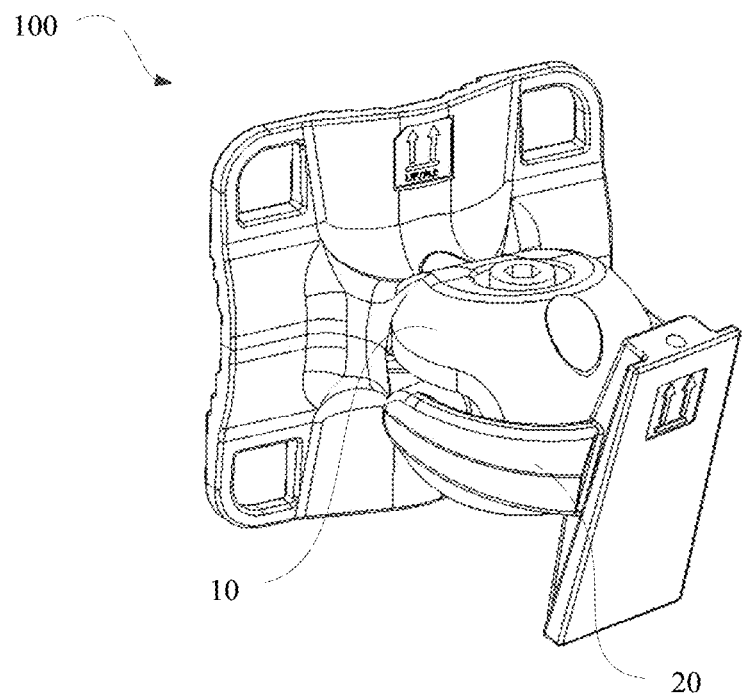
FIG. 1 is a schematic diagram of a first structure of an angle adjustment apparatus according to an embodiment of this application.

100—Angle adjustment apparatus; 10—Fastening component; 11—First fastener; 111—First groove body; 1111—First rotation groove; 1112—First chute; 1113—Second through hole; 112—First fastening part; 1121—First mounting hole; 1122—Concave part; 1123—Toothed structure; 113—First connection part; 1131—Fourth through hole; 1132—Horizontal adjustment angle scale identifier; 114—First transition part; 1141—Third through hole; 1142—Convex point; 1143—Concave hole; 115—First step; 12—Second fastener; 121—Second groove body; 1211—Second rotation groove; 1212—Second chute; 122—Second fastening part; 1221—Second mounting hole; 123—Second connection part; 124—Second transition part; 125—Second step; 20—Angle adjustment component; 21—Support member; 211—Support plate; 212—Ring arm; 22—Rotation member; 221—Rotation part; 2211—First through hole; 2212—Oblique arc surface; 222—Linkage part; 2221—Vertical adjustment angle scale identifier; 201—Male dovetail; 30—Positioning member; 40—Adapter component; 41—Adapter board; 411—Handle; 412—Mounting interface; 401—Female dovetail; 50—First stud; 60—Second stud.

DESCRIPTION OF EMBODIMENTS

The terms used in the implementations of this application are merely used to explain embodiments of this application, and are not intended to limit this application. The following describes the implementations of embodiments of this application in detail with reference to the accompanying drawings.

Currently, due to a function requirement such as signal coverage, an azimuth (a rotation angle in a horizontal direction) and a downtilt (an oblique angle in a vertical direction) need to be adjusted for mounting of some communications devices. In the conventional technology, a communications device is usually fastened to a mounting carrier by using a mounting mechanism that can implement angle adjustment (the mounting carrier is compatible with two mounting environments: wall hanging and pole holding), and then mounting of the communications device at different angles is implemented by using an angle adjustment function of the mounting mechanism. The mounting mechanism includes: a fastener configured to fasten a multifunctional mounting bracket, an intermediate member configured to adjust a device mounting direction, and a device fastener configured to fasten the device. The intermediate member is connected to the fastener by using a horizontal adjustment mechanism or a vertical adjustment mechanism, and the device fastener is connected to the intermediate member by using a vertical adjustment mechanism or a horizontal adjustment mechanism. In an embodiment, when the intermediate member is connected to the fastener by using a horizontal adjustment mechanism, the device fastener is connected to the intermediate member by using a vertical adjustment mechanism; or when the intermediate member is connected to the fastener by using a vertical adjustment mechanism, the device fastener is connected to the intermediate member by using a horizontal adjustment mechanism, so that the mounting mechanism can support angle adjustment positioning in both a horizontal direction and a vertical direction.

However, in the foregoing mounting mechanism, when both the horizontal direction and the vertical direction have angle adjustment requirements, angle adjustment in the horizontal direction needs to be first performed, and then a horizontal adjustment mechanism needs to be locked; and then angle adjustment in the vertical direction needs to be performed, and then a vertical adjustment mechanism needs to be locked. Alternatively, angle adjustment in the vertical direction needs to be first performed, and then a vertical adjustment mechanism needs to be locked; and then angle adjustment in the horizontal direction needs to be performed, and then a horizontal adjustment mechanism needs to be locked. Because the horizontal adjustment mechanism and the vertical adjustment mechanism are independently controlled, angle adjustment efficiency of the mounting mechanism is low. In addition, because a rotation axis of the horizontal adjustment mechanism and a rotation axis of the vertical adjustment mechanism are not located on one plane, the device is prone to be oblique after the mounting mechanism performs angle adjustment, affecting a signal coverage function of the device.

Based on this, embodiments of this application provide an angle adjustment apparatus, to implement a horizontal and vertical omnidirectional angle adjustment requirement, to support device mounting and fastening and an angle adjustment operation performed after the mounting. An angle adjustment function in a horizontal direction and an angle adjustment function in a vertical direction are integrated into a same component, that is, an angle adjustment component can rotate in both the horizontal direction and the vertical direction relative to a fastening component, so that the angle adjustment apparatus greatly improves angle adjustment efficiency. In addition, because a rotation axis in the horizontal direction and a rotation axis in the vertical direction of the angle adjustment apparatus are located on a same plane, a device can be prevented from being oblique after angle adjustment, thereby preventing a signal coverage function of the device from being affected. Furthermore, a distance that is from the device to a wall or a pole and that is obtained after mounting can be greatly reduced, thereby greatly improving device mounting convenience and beauty obtained after the mounting, and supporting fast mounting and deployment of the communications device.

Figure 2:
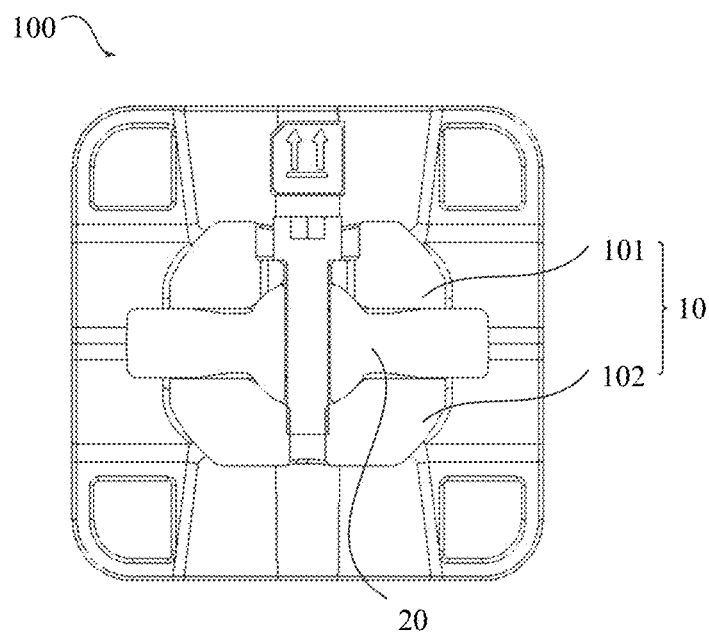
FIG. 2 is a side view of the angle adjustment apparatus shown in FIG. 1.

Referring to FIG. 1 and FIG. 2, an angle adjustment apparatus 100 provided in an embodiment of this application may include a fastening component 10 and an angle adjustment component 20 rotatably connected to the fastening component 10. At least a part of the angle adjustment component 20 is located in the fastening component 10, and the angle adjustment component 20 can rotate in a horizontal direction and a vertical direction relative to the fastening component 10.

Figure 3:
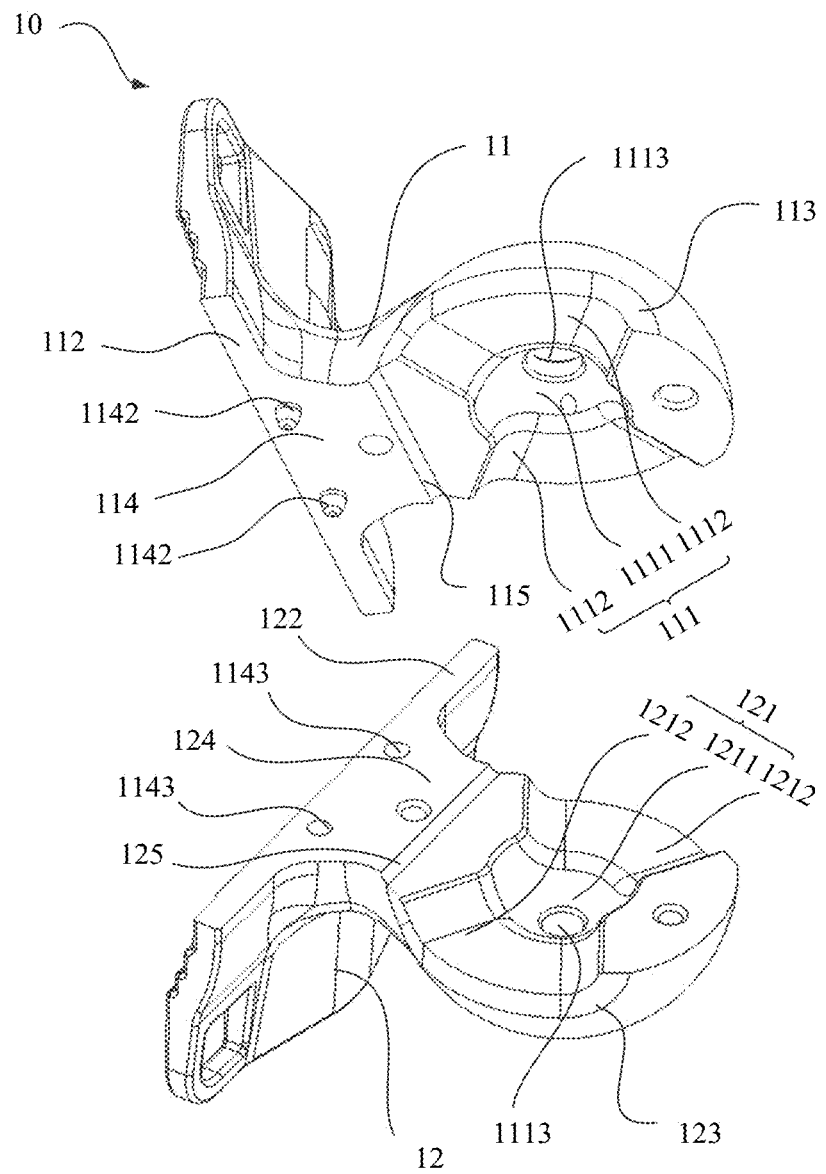
FIG. 3 is a schematic diagram of a first structure of a fastening component of an angle adjustment apparatus according to an embodiment of this application.

As shown in FIG. 3, the fastening component 10 may include a first fastener 11 and a second fastener 12. In addition, the first fastener 11 may have a first groove body 111, the second fastener 12 may have a second groove body 121, and at least the part of the angle adjustment component 20 is located in an accommodation cavity formed by the first groove body 111 and the second groove body 121 through enclosing.

Still referring to FIG. 3, the first groove body 111 may include a first rotation groove 1111 and first chutes 1112 located on two sides of the first rotation groove 1111, and the second groove body 121 may include a second rotation groove 1211 and second chutes 1212 located on two sides of the second rotation groove 1211. A first accommodation cavity may be formed by the first rotation groove 1111 and the second rotation groove 1211 through enclosing, and second accommodation cavities may be formed by the first chutes 1112 and the second chutes 1212 through enclosing.

Figure 4:
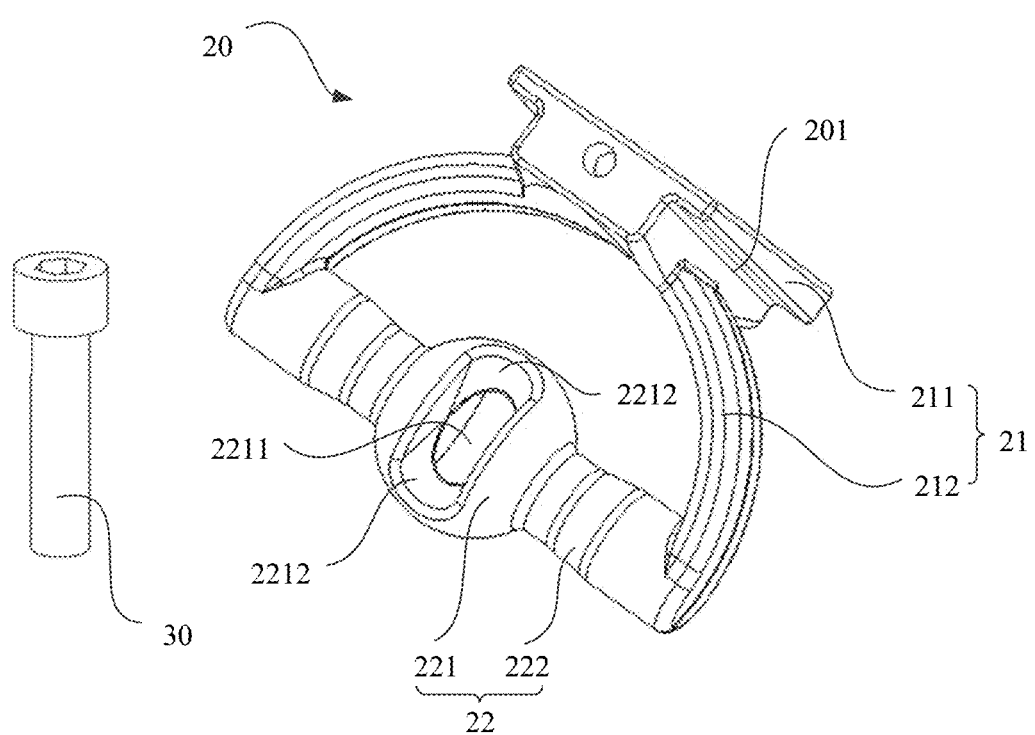
FIG. 4 is a schematic diagram of a structure of an angle adjustment component of an angle adjustment apparatus according to an embodiment of this application.

As shown in FIG. 4, the angle adjustment component 20 may include a support member 21 and a rotation member 22 fixedly connected to the support member 21. The rotation member 22 is located in the accommodation cavity formed by the first groove body 111 and the second groove body 121 through enclosing, and the rotation member 22 can rotate in the horizontal direction relative to the first fastener 11 and the second fastener 12.

In an embodiment, the rotation member 22 may include a rotation part 221 and linkage parts 222 located on two sides of the rotation part 221. The rotation part 221 is located in the first accommodation cavity formed by the first rotation groove 1111 and the second rotation groove 1211, and the linkage parts 222 are located in the second accommodation cavities formed by the first chutes 1112 and the second chutes 1212.

In an embodiment of the application, the angle adjustment apparatus 100 may further include a positioning member 30. As shown in FIG. 4, the rotation part 221 may have a first through hole 2211 extending in a length direction of the positioning member 30, and an inner wall of the first through hole 2211 may have an oblique arc surface 2212. The positioning member 30 is located in the first through hole 2211, and when the rotation member 22 rotates in the vertical direction relative to the positioning member 30, the oblique arc surface 2212 is used to limit a rotation range of the rotation member 22. The positioning member 30 is disposed, so that a pressure change of a contact surface can be implemented, thereby affecting contact friction, to implement immediate positioning and locking in an angle adjustment process.

In an embodiment, the rotation part 221 may be of a spherical structure. The rotation part 221 can implement fusion of horizontal and vertical bidirectional angle adjustment axes.

Still referring to FIG. 4, the support member 21 may include a support plate 211 and ring arms 212 fixedly connected to two sides of the support plate 211. The ring arms 212 are fixedly connected to the linkage parts 222 in the rotation member 22. After the rotation member 22 of the angle adjustment component 20 is embedded in the accommodation cavity formed by the first groove body 111 of the first fastener 11 and the second groove body 121 of the second fastener 12 in the fastening component 10, the ring arms 212 surround the periphery of the first fastener 11 and the second fastener 12, so that rotation flexibility of the angle adjustment component 20 relative to the fastening component 10 can be ensured when the angle adjustment apparatus 100 experiences an abnormal scenario such as severe impact and tearing.

Figure 5:
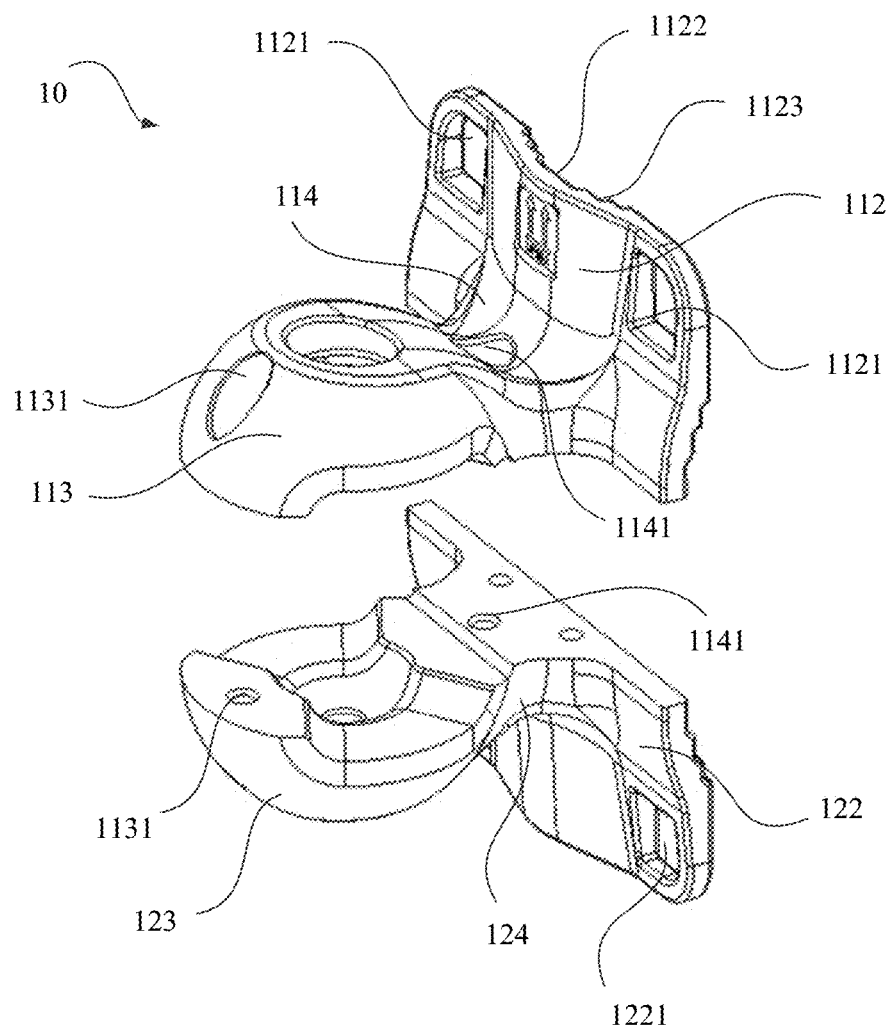
FIG. 5 is a schematic diagram of a second structure of a fastening component of an angle adjustment apparatus according to an embodiment of this application.

In an embodiment of the application, as shown in FIG. 5, the first fastener 11 may include a first fastening part 112 and a first connection part 113, and at least one first mounting hole 1121 may be disposed in the first fastening part 112. Likewise, the second fastener 12 may include a second fastening part 122 and a second connection part 123, and at least one second mounting hole 1221 may be disposed in the second fastening part 122.

It should be noted that the fastening component 10 (the first fastener 11 and the second fastener 12) can be fastened to a plane such as a wall by using the first mounting hole 1121 and the second mounting hole 1221, to cooperate with a steel belt, a hose clamp, an expansion bolt, or the like to implement reliable mounting of pole holding and wall hanging. For example, in an embodiment of the application, the fastening component 10 may be fastened to a predetermined mounting position by penetrating a hose clamp through the first mounting hole 1121 disposed in the first fastening part 112 and the second mounting hole 1221 disposed in the second fastening part 122. For example, the fastening component 10 may be fastened to various pole-shaped fastening apparatuses by using a hose clamp, and fastening to pole-shaped fastening apparatuses of various sizes and diameters may be implemented in cooperation with hose clamps of different lengths.

In addition, to further ensure stability of fastening to the pole-shaped fastening apparatus, a contact area between the fastening component 10 and the pole-shaped fastening apparatus is increased, and contact friction between the fastening component 10 and the pole-shaped fastening apparatus is increased. There may be a concave part 1122 on a side that is of the first fastening part 112 and that faces away from the first connection part 113, and the concave part 1122 has a toothed structure 1123. There may also be a concave part 1122 on a side that is of the second fastening part 122 and that faces away from the second connection part 123, and the concave part 1122 may have a toothed structure 1123.

It should be noted that the angle adjustment apparatus 100 provided in an embodiment of the application can support angle adjustment positioning in both the horizontal direction and the vertical direction, and is also compatible with two mounting environments: wall hanging and pole holding.

It may be understood that, to further ensure stability of a device mounted to the angle adjustment apparatus 100 used for device mounting, the first fastener 11 and the second fastener 12 in the fastening component 10 in an embodiment of the application may be symmetrical structures.

In an embodiment of the application, as shown in FIG. 3, the first groove body 111 is located in the first connection part 113, the second groove body 121 is located in the second connection part 123, and a second through hole 1113 through which the positioning member 30 can be penetrated may be disposed on each of a groove bottom of the first rotation groove 1111 and a groove bottom of the second rotation groove 1211. In this way, the positioning member 30 may be sequentially penetrated through a second through hole 1113 located in the first fastener 11, the first through hole 2211 located in the angle adjustment component 20, and a second through hole 1113 located in the second fastener 12, to implement fastening and connection between the fastening component 10 and the angle adjustment component 20.

In an embodiment, still referring to FIG. 3, the first fastener 11 may further include a first transition part 114 located between the first fastening part 112 and the first connection part 113, and a first step 115 may be formed between the first transition part 114 and the first connection part 113. Likewise, the second fastener 12 may further include a second transition part 124 located between the second fastening part 122 and the second connection part 123, and a second step 125 is formed between the second transition part 124 and the second connection part 123.

The first step 115 is formed between the first transition part 114 and the first connection part 113 of the first fastener 11, and the second step 125 is formed between the second transition part 124 and the second connection part 123 of the second fastener 12. Therefore, when the first fastener 11 and the second fastener 12 are assembled into the fastening component 10, the first transition part 114 fits with the second transition part 124, and a gap is formed between the first connection part 113 and the second connection part 123. The gap can reserve adjustment space for accommodating the rotation member 22 in the accommodation cavity formed by the first groove body 111 and the second groove body 121, to improve matchability and versatility during mounting of the fastening component 10 to the angle adjustment component 20. In addition, disposition of step positions (the first step 115 and the second step 125) can further improve a spherical hinge holding force obtained after assembly.

In an embodiment of the application, as shown in FIG. 5, at least one third through hole 1141 may be disposed in each of the first transition part 114 and the second transition part 124, and at least one fourth through hole 1131 may be further disposed on each of one end that is of the first connection part 113 and that is away from the first transition part 114 and one end that is of the second connection part 123 and that is away from the second transition part 124.

Figure 11:
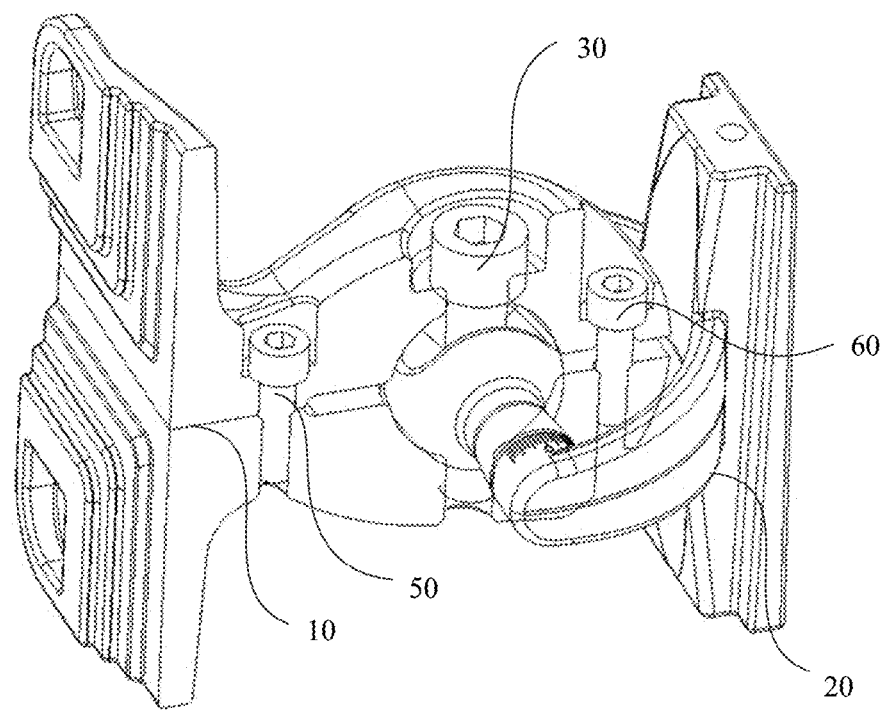
FIG. 11 is a schematic diagram of a second structure of an angle adjustment apparatus according to an embodiment of this application.

In this way, the first fastener 11 and the second fastener 12 may be pre-fastened by penetrating a first stud 50 (shown in FIG. 11) through a third through hole 1141 in the first transition part 114 and a third through hole 1141 in the second transition part 124; the first fastener 11 and the second fastener 12 may be pre-fastened by penetrating a second stud 60 (shown in FIG. 11) through a fourth through hole 1131 on the end that is of the first connection part 113 and that is away from the first transition part 114 and a fourth through hole 1131 on the end that is of the second connection part 123 and that is away from the second transition part 124; or the first fastener 11 and the second fastener 12 may be pre-fastened by penetrating the first stud 50 through the third through hole 1141 in the first transition part 114 and the third through hole 1141 in the second transition part 124 and also penetrating the second stud 60 through the fourth through hole 1131 on the end that is of the first connection part 113 and that is away from the first transition part 114 and the fourth through hole 1131 on the end that is of the second connection part 123 and that is away from the second transition part 124.

In addition, in a production assembly process, tightening torque of the first stud 50 and the second stud 60 may be controlled to control constraint forces of the first fastener 11 and the second fastener 12 for the rotation part 221 of the rotation member 22 in the angle adjustment component 20, to implement continuous positioning in an angle adjustment process under a weight carrying condition.

To further ensure accurate positioning during mounting of the first fastener 11 to the second fastener 12, at least one convex point 1142 may be disposed on one of the first transition part 114 and the second transition part 124, and at least one concave hole 1143 may be disposed on the other of the first transition part 114 and the second transition part 124. The convex point 1142 is in a one-to-one correspondence with and cooperatively connected to the concave hole 1143.

In an embodiment of the application, a disposition manner of the convex point 1142 and the concave hole 1143 includes but is not limited to the following two possible implementations:

An embodiment is as follows: Referring to FIG. 3, at least one convex point 1142 is disposed on the first transition part 114, and at least one concave hole 1143 is disposed on the second transition part 124.

An embodiment is as follows: At least one convex point 1142 is disposed on the second transition part 124, and at least one concave hole 1143 is disposed on the first transition part 114.

It should be noted that shapes and quantities of convex points 1142 and concave holes 1143 are not limited in an embodiment of the application, provided that an accurate positioning effect can be implemented. In an embodiment, as shown in FIG. 3, there may be two convex points 1142 on the first transition part 114, there may be two concave holes 1143 on the second transition part 124, and the convex points 1142 are in a one-to-one correspondence with and cooperatively connected to the concave holes 1143.

Figure 6:
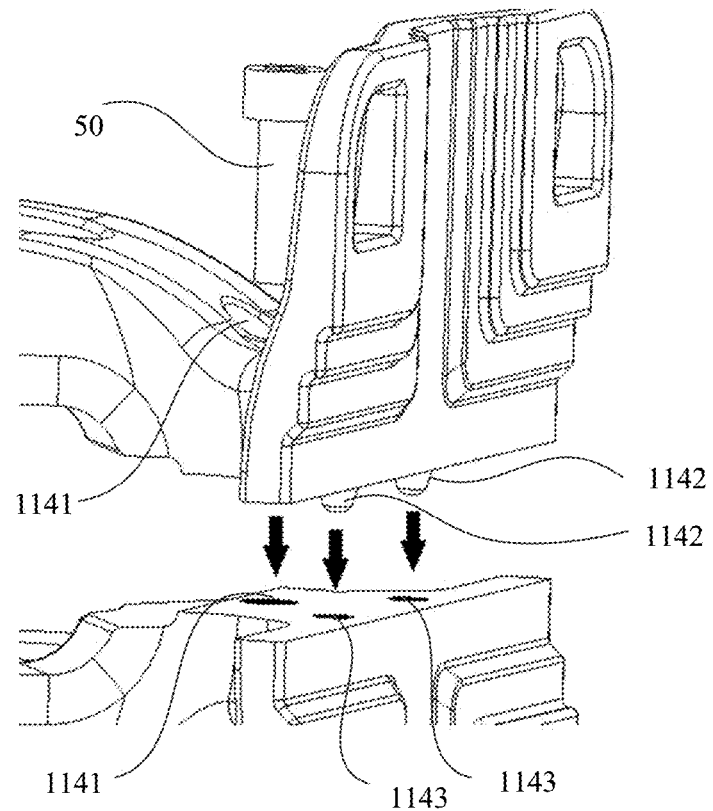
FIG. 6 is a schematic diagram of a third structure of a fastening component of an angle adjustment apparatus according to an embodiment of this application.

In an embodiment of the application, when the first fastener 11 and the second fastener 12 are actually mounted, as shown in FIG. 6, the convex points 1142 are correspondingly mounted to the concave holes 1143, and then the first stud 50 is penetrated through the third through hole 1141 in the first fastener 11 and the third through hole 1141 in the second fastener 12, thereby implementing pre-mounting of the first fastener 11 and the second fastener 12.

Certainly, in some other embodiments, at least one convex point 1142 and at least one concave hole 1143 may be disposed on one of the first transition part 114 and the second transition part 124, and at least one concave hole 1143 and at least one convex point 1142 may be disposed on the other of the first transition part 114 and the second transition part 124. A convex point 1142 on the first transition part 114 is cooperatively connected to a concave hole 1143 on the second transition part 124, and a concave hole 1143 on the first transition part 114 is cooperatively connected to a convex point 1142 on the second transition part 124. In this way, compared with the solution in which at least one convex point 1142 may be disposed on one of the first transition part 114 and the second transition part 124, and at least one convex hole 1143 may be disposed on the other of the first transition part 114 and the second transition part 124, accuracy of mounting and positioning between the first fastener 11 and the second fastener 12 can be further improved.

Figure 7:
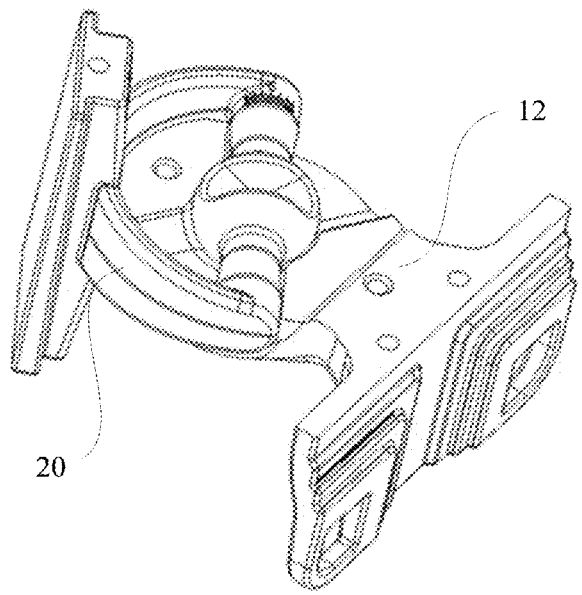
FIG. 7 is a schematic diagram of a first structure in which a fastening component and an angle adjustment component of an angle adjustment apparatus are in a connected state according to an embodiment of this application.
Figure 8:
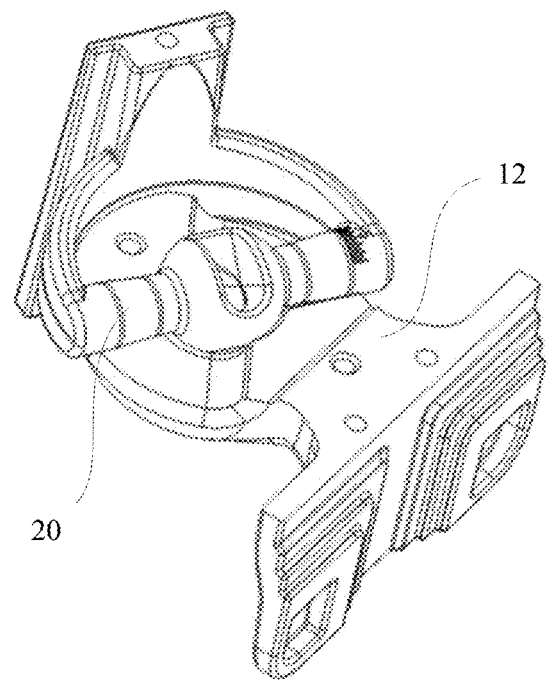
FIG. 8 is a schematic diagram of a second structure in which a fastening component and an angle adjustment component of an angle adjustment apparatus are in a connected state according to an embodiment of this application.

FIG. 7 to FIG. 10 are schematic diagrams of structures of rotation statuses of the angle adjustment apparatus 100 according to embodiments of this application. FIG. 7 and FIG. 8 are diagrams of statuses of the angle adjustment apparatus 100 in a horizontal rotation process. When the angle adjustment component 20 rotates in the horizontal direction relative to the fastening component 10, the rotation member 22 of the angle adjustment component 20 is located in the accommodation cavity formed by the first groove body 111 of the first fastener 11 and the second groove body 121 of the second fastener 12 in the fastening component 10. In an embodiment, the rotation part 221 is located in the first accommodation cavity formed by the first rotation groove 1111 and the second rotation groove 1211, the linkage parts 222 are located in the second accommodation cavities formed by the first chutes 1112 and the second chutes 1212, and the first chutes 1112 and the second chutes 1212 can limit moving ranges of the linkage parts 222, to limit a rotation range of the angle adjustment component 20 in the horizontal direction relative to the fastening component 10. After the first fastener 11 is cut off, FIG. 7 shows a rotation position of the angle adjustment component 20 in the horizontal direction relative to the second fastener 12 in the fastening component 10, and FIG. 8 shows another rotation position of the angle adjustment component 20 in the horizontal direction relative to the second fastener 12 in the fastening component 10.

Figure 9:
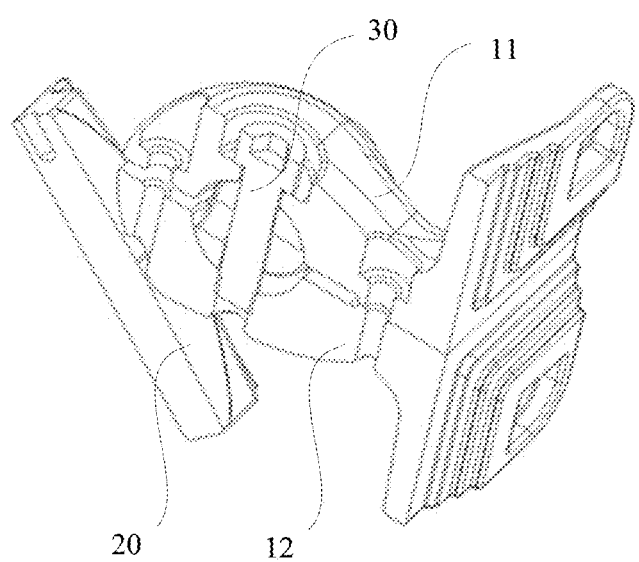
FIG. 9 is a schematic diagram of a third structure in which a fastening component and an angle adjustment component of an angle adjustment apparatus are in a connected state according to an embodiment of this application.
Figure 10:
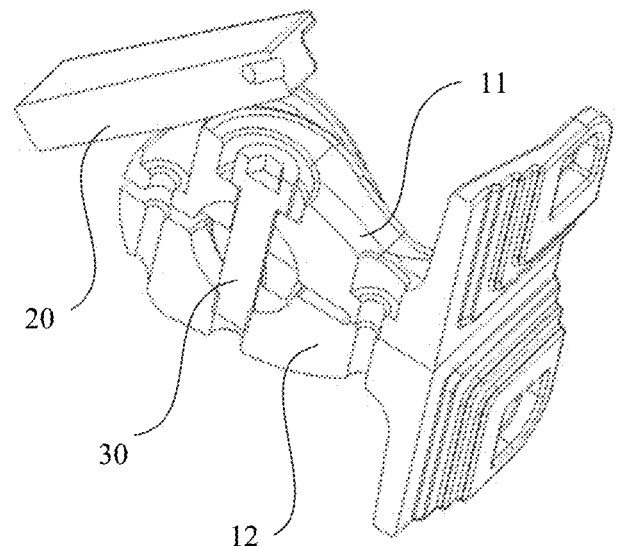
FIG. 10 is a schematic diagram of a fourth structure in which a fastening component and an angle adjustment component of an angle adjustment apparatus are in a connected state according to an embodiment of this application.

When the angle adjustment component 20 rotates in the vertical direction relative to the fastening component 10, the rotation member 22 of the angle adjustment component 20 is located in the accommodation cavity formed by the first groove body 111 of the first fastener 11 and the second groove body 121 of the second fastener 12 in the fastening component 10. In an embodiment, the rotation part 221 is located in the first accommodation cavity formed by the first rotation groove 1111 and the second rotation groove 1211, and the inner wall of the first through hole 2211 has the oblique arc surface 2212, and the positioning member 30 is located in the first through hole 2211. When the rotation member 22 rotates in the vertical direction relative to the positioning member 30, the oblique arc surface 2212 is used to limit the rotation range of the rotation member 22 in the vertical direction. After the fastening component 10 and the angle adjustment component 20 are vertically sectioned along a plane on which an overall symmetry axis is located, FIG. 9 shows a rotation position of the angle adjustment component 20 in the vertical direction relative to the first fastener 11 and the second fastener 12 in the fastening component 10, and FIG. 10 shows another rotation position of the angle adjustment component 20 in the vertical direction relative to the first fastener 11 and the second fastener 12 in the fastening component 10.

In an embodiment of the application, when the fastening component 10 and the angle adjustment component 20 perform angle adjustment, the rotation member 22 of the angle adjustment component 20 is embedded in the accommodation cavity formed by the first groove body 111 of the first fastener 11 and the second groove body 121 of the second fastener 12 in the fastening component 10. Then, referring to FIG. 11, the first stud 50 and the second stud 60 are first used to perform pre-fastening, to provide a damping force; and then the angle adjustment component 20 is rotated to separately adjust rotation angles of the angle adjustment component 20 in the horizontal direction and the vertical direction relative to the fastening component 10. After the angle adjustment component 20 is adjusted to proper rotation angles, the positioning member 30 is sequentially penetrated through the fastening component 10 and the angle adjustment component 20 to perform angle fixing on the angle adjustment component 20. After the positioning member 30 is tightened, full constraint locking is implemented between the fastening component 10 and the angle adjustment component 20.

Figure 12:
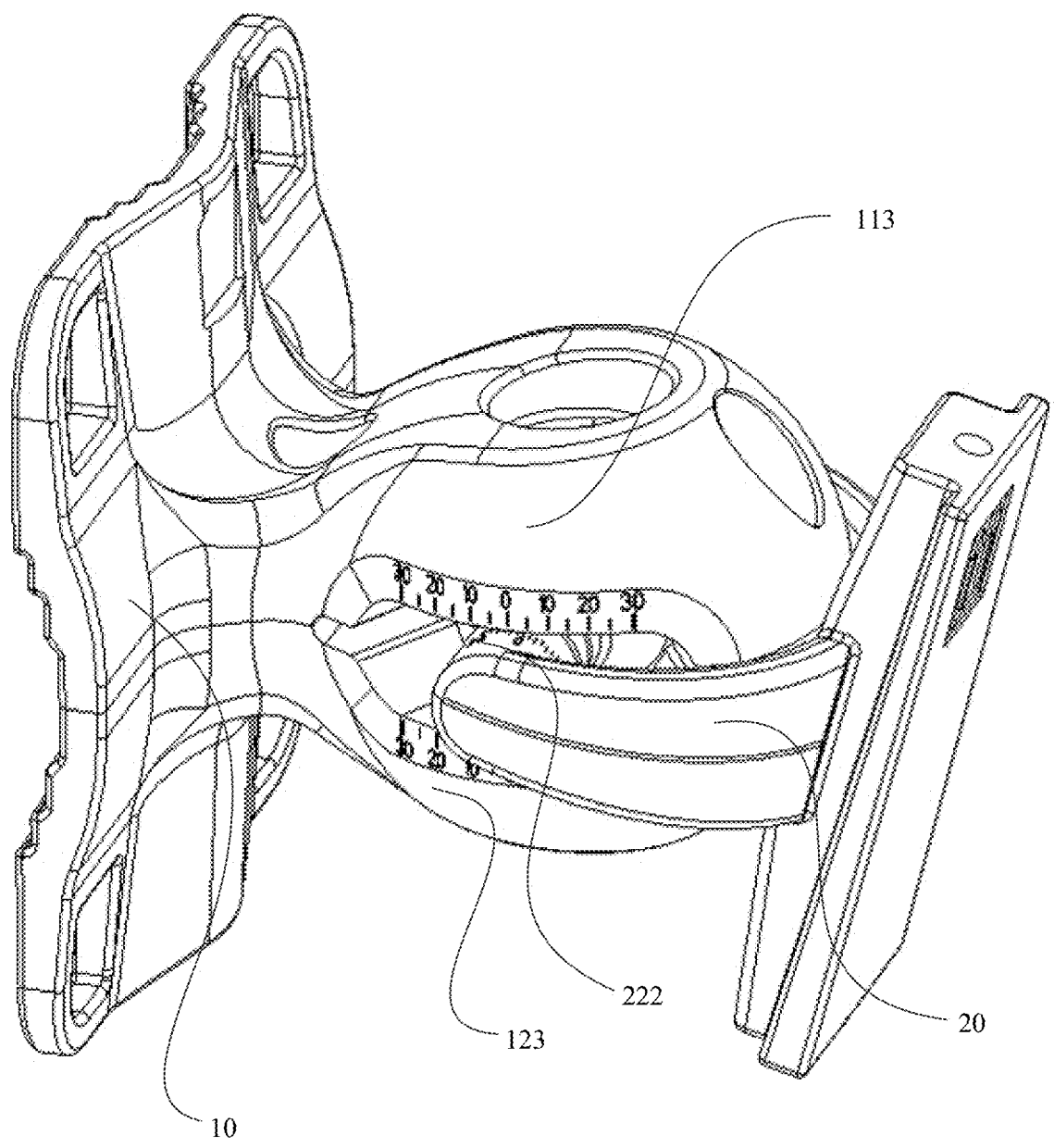
FIG. 12 is a schematic diagram of a third structure of an angle adjustment apparatus according to an embodiment of this application.
Figure 13:
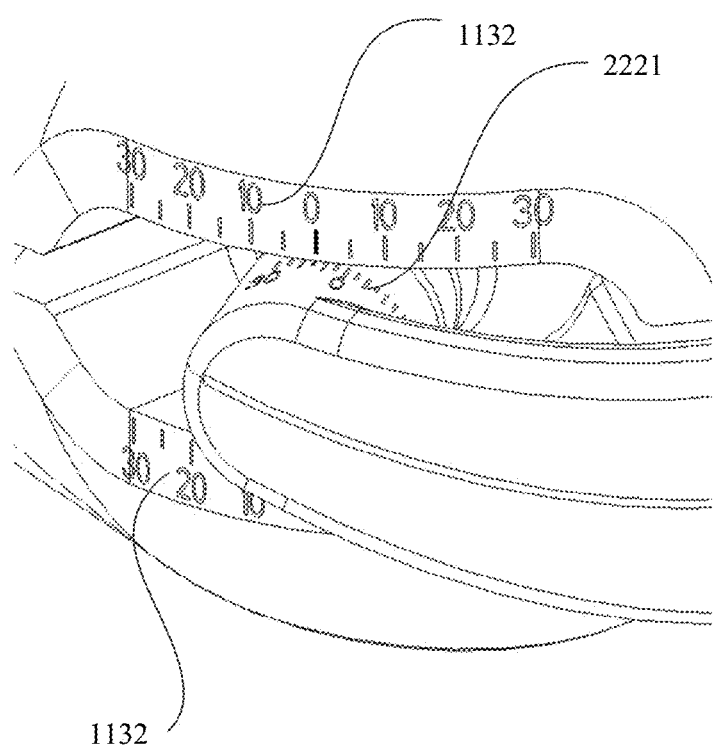
FIG. 13 is a schematic enlarged diagram of a part of the angle adjustment apparatus shown in FIG. 12.

In an embodiment, as shown in FIG. 12 and FIG. 13, a horizontal adjustment angle scale identifier 1132 may be disposed at a position at which an outer edge of the first connection part 113 of the fastening component 10 is close to the linkage part 222 or at a position at which an outer edge of the second connection part 123 of the fastening component 10 is close to the linkage part 222. In this way, when the angle adjustment component 20 is rotated in the horizontal direction relative to the fastening component 10, the horizontal adjustment angle scale identifier 1132 may be used to display a rotation angle of the angle adjustment component 20 in the horizontal direction relative to the fastening component 10, to indicate a magnitude of an adjustment angle in the horizontal direction.

In addition, a vertical adjustment angle scale identifier 2221 may be further disposed at a position at which the linkage part 222 of the rotation member 22 is exposed from the first connection part 113 or the second connection part 123. In this way, when the angle adjustment component 20 is rotated in the vertical direction relative to the fastening component 10, the vertical adjustment angle scale identifier 2221 may be used to display a rotation angle of the angle adjustment component 20 in the vertical direction relative to the fastening component 10, to indicate a magnitude of an adjustment angle in the vertical direction.

In an embodiment, the horizontal adjustment angle scale identifier 1132 and the vertical adjustment angle scale identifier 2221 may be calibrated by using a process such as laser or printing.

The horizontal adjustment angle scale identifier 1132 is disposed at the position at which the outer edge of the first connection part 113 of the fastening component 10 is close to the linkage part 222 or the position at which the outer edge of the second connection part 123 of the fastening component 10 is close to the linkage part 222, and the vertical adjustment angle scale identifier 2221 is also disposed at the position at which the linkage part 222 of the rotation member 22 is exposed from the first connection part 113 or the second connection part 123. Therefore, in an angle adjustment process, an angle adjustment position in the horizontal direction and an angle adjustment position in the vertical direction can be determined at one time based on a scale at a position at which the first connection part 113 is closest to the linkage part 222 or based on a scale at a position at which the second connection part 123 is closest to the linkage part 222.

Figure 14:
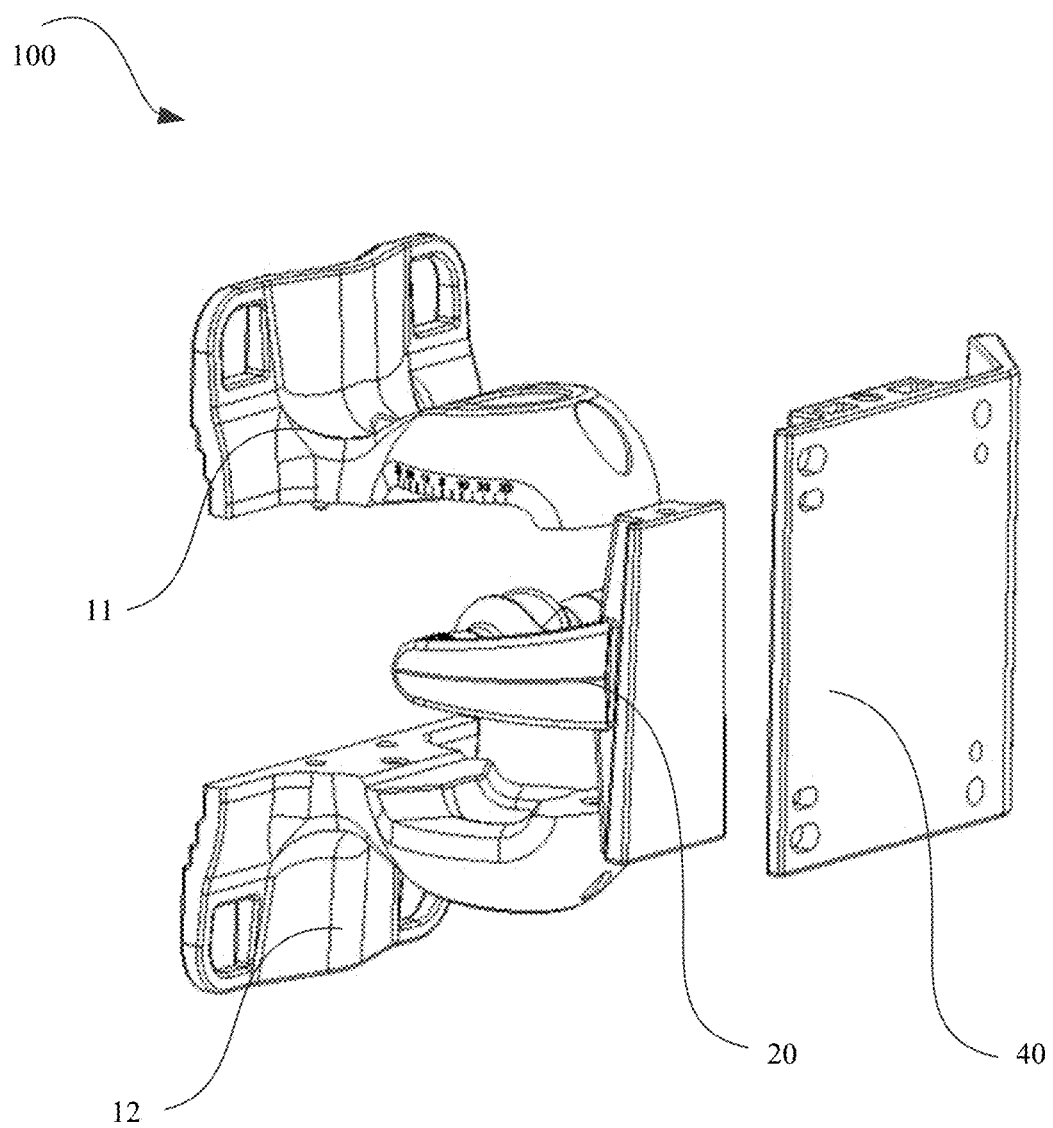
FIG. 14 is a schematic diagram of a fourth structure of an angle adjustment apparatus according to an embodiment of this application.
Figure 15:
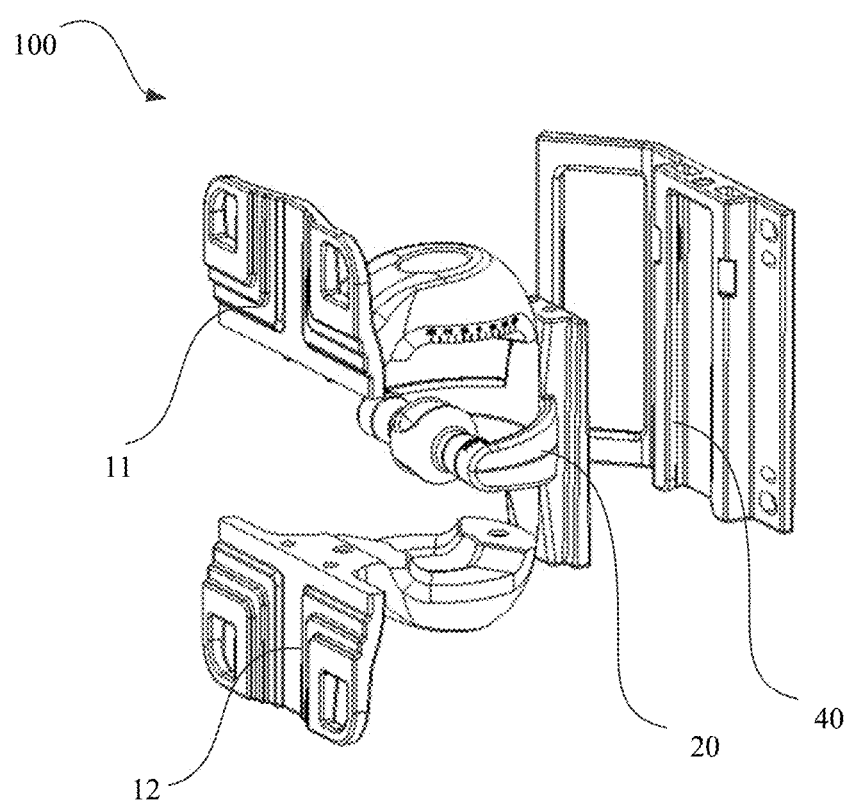
FIG. 15 is a schematic diagram of a fifth structure of an angle adjustment apparatus according to an embodiment of this application.

In an embodiment of the application, the angle adjustment apparatus 100 may further include an adapter component 40. Referring to FIG. 14 and FIG. 15, the adapter component 40 may be located on a side that is of the angle adjustment component 20 and that is away from the fastening component 10, and the adapter component 40 is detachably connected to the angle adjustment component 20.

In an embodiment, the adapter component 40 may be connected to the angle adjustment component 20 by using a dovetail structure. Fast deployment mounting and locking of the adapter component 40 to the angle adjustment component 20 can be implemented by disposing the dovetail structure. In an embodiment, the dovetail structure may include a male dovetail 201 and a female dovetail 401. The male dovetail 201 may be disposed on one of the adapter component 40 and the angle adjustment component 20, and the female dovetail 401 may be disposed on the other of the adapter component 40 and the angle adjustment component 20. The male dovetail 201 is cooperatively connected to the female dovetail 401.

Figure 16:
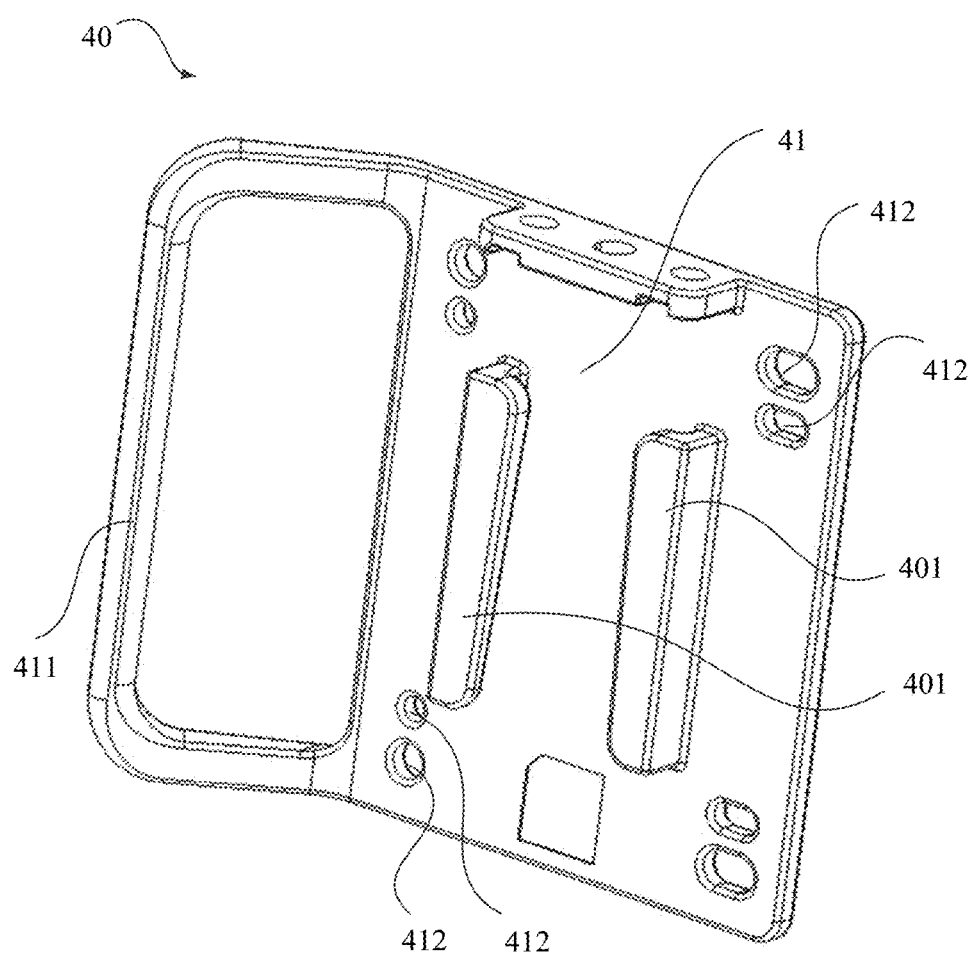
FIG. 16 is a schematic diagram of a structure of an adapter component of an angle adjustment apparatus according to an embodiment of this application.

For example, in an embodiment of the application, the female dovetail 401 is disposed on the adapter component 40 (as shown in FIG. 16), and the male dovetail 201 is disposed on the angle adjustment component 20 (as shown in FIG. 4). During actual mounting, a bottom of the female dovetail 401 on the adapter component 40 may slide onto the angle adjustment component 20 from a top of the male dovetail 201 on the angle adjustment component 20. Under a guiding action, fast mounting is implemented. In this way, the male dovetail 201 cooperates with the female dovetail 401 to implement the connection between the adapter component 40 and the angle adjustment component 20.

Certainly, in some other embodiments, the adapter component 40 in an embodiment of the application may be connected to the angle adjustment component 20 in another detachable manner, for example, through threaded connection, pin connection, adhesive connection, or buckle connection. A structure of the detachable connection is not limited in an embodiment of the application. Further, the adapter component 40 may be connected to the angle adjustment component 20 in a non-detachable manner. For example, both a connection end of the adapter component 40 and a connection end of the angle adjustment component 20 are metal materials. In this case, the two components may be connected in a welding manner.

In an embodiment, as shown in FIG. 16, the adapter component 40 may include an adapter board 41. The female dovetail 401 is disposed on a surface that is of the adapter board 41 and that faces the angle adjustment component 20, and a handle 411 and a mounting interface 412 configured to be connected to an external device may be further disposed on the adapter board 41. The handle 411 can facilitate holding and lifting of an operator for the adapter board 41, and the mounting interface 412 corresponds to a side interface of the external device, to implement fast mounting connection between the adapter board 41 and the external device.

In addition, it should be noted that the angle adjustment apparatus 100 provided in an embodiment of the application is applicable to angle adjustment mounting not only for a communications device, but also for a device that relates to angle adjustment mounting in others fields such as an indoor field or an outdoor field, for example, a common security device or an energy device.

In the description of embodiments of this application, it should be noted that, unless otherwise specified and limited, the term "mounting" or "connection" should be understood in a broad sense, for example, may be fastened connection, may be indirect connection performed by using an intermediate medium, or may be interconnection between two elements, or an interaction relationship between two elements. For persons of ordinary skill in the art, a meaning of the term in embodiments of this application may be understood based on a case.

In embodiments of this application, direction or position relationships are direction or position relationships shown based on the accompanying drawings, and are merely intended to describe this application and simplify description, but are not intended to indicate or imply that an indicated apparatus or element shall have a direction or be formed and operated in a direction, and therefore shall not be understood as limitations on this application. In the description of embodiments of this application, "a plurality of" means at least two, unless otherwise accurately specified.

In the specification, claims, and accompanying drawings of embodiments of this application, the terms "first", "second", "third", "fourth", and so on (if existent) are intended to distinguish between similar objects but do not necessarily indicate an order or sequence. It should be understood that the data termed in such a way are interchangeable in proper circumstances so that embodiments of this application described herein can be implemented in orders except the order illustrated or described herein. In addition, terms such as "include", "have", and any variations thereof are intended to cover non-exclusive inclusions, for example, a process, method, system, product, or device that includes a series of operations or units is not necessarily limited to those clearly listed operations or units, but may include other operations or units that are not clearly listed or inherent to such a process, method, product, or device.

Finally, it should be noted that the foregoing embodiments are merely intended for describing the technical solutions of embodiments of this application, rather than limiting embodiments of this application. Although embodiments of this application are described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of embodiments of the present application.

What is claimed is:

1. An angle adjustment apparatus, comprising:
   a fastening component;
   an angle adjustment component rotatably connected to the fastening component, wherein at least a part of the angle adjustment component is located in the fastening component, and the angle adjustment component can rotate in a horizontal direction and a vertical direction relative to the fastening component; and
   an adapter component connected to the angle adjustment component by using a dovetail structure with a male dovetail and a female dovetail, wherein the adapter component comprises an adapter board, wherein the male dovetail or the female dovetail is disposed on a side of the adapter board facing the angle adjustment component, wherein the adapter component is located on a side of the angle adjustment component away from the fastening component, and wherein the adapter component is detachably connected to the angle adjustment component.

2. The angle adjusting apparatus according to claim 1, wherein the fastening component comprises:
   a first fastener having a first groove body, and
   a second fastener having a second groove body, wherein at least the part of the angle adjustment component is located in an accommodation cavity formed by the first groove body and the second groove body.

3. The angle adjustment apparatus according to claim 2, wherein the angle adjustment component comprises:
   a support member which can rotate in the horizontal direction relative to the first fastener and the second fastener, and
   a rotation member fixedly connected to the support member,
   wherein the rotation member is located in the accommodation cavity.

4. The angle adjustment apparatus according to claim 3, wherein the first groove body comprises:
   a first rotation groove, and
   first chutes located on two sides of the first rotation groove, and
   wherein the second groove body comprises:
   a second rotation groove, and
   second chutes located on two sides of the second rotation groove;
   wherein the rotation member comprises:
   a rotation part located in a first accommodation cavity formed by the first rotation groove and the second rotation groove, and
   linkage parts located on two sides of the rotation part,
   wherein the linkage parts are located in second accommodation cavities formed by the first chutes and the second chutes.

5. The angle adjustment apparatus according to claim 4, further comprising:
   a positioning member, wherein the rotation part has a first through hole extending in a length direction of the positioning member, wherein an inner wall of the first through hole has an oblique arc surface, wherein
   when the rotation member rotates in the vertical direction relative to the positioning member, the positioning member is located in the first through hole, and wherein the oblique arc surface is used to limit a rotation range of the rotation member.

6. The angle adjustment apparatus according to claim 5, wherein a second through hole through which the positioning member can be penetrated is disposed on each of a groove bottom of the first rotation groove and a groove bottom of the second rotation groove.

7. The angle adjustment apparatus according to claim 4, wherein the rotation part is of a spherical structure.

8. The angle adjustment apparatus according to claim 4, wherein the support member comprises:
   a support plate, and
   ring arms fixedly connected to two sides of the support plate, wherein
   the ring arms are connected to the linkage parts in the rotation member.

9. The angle adjustment apparatus according to claim 8, wherein the first fastener comprises:

a first fastening part, a first connection part, wherein the first groove body is located on the first connection part, at least one first mounting hole disposed in the first fastening part, and a concave part on a side of the first fastening part faces away from the first connection part, wherein the concave part has a toothed structure; and the second fastener comprises:

a second fastening part, a second connection part, wherein the second groove body is located on the second connection part, at least one second mounting hole disposed in the second fastening part, and a concave part on a side of the second fastening part faces away from the second connection part, wherein the concave part has a toothed structure.

10. The angle adjustment apparatus according to claim 9, wherein the first fastener further comprises:

a first transition part located between the first fastening part and the first connection part, and a first step formed between the first transition part and the first connection part; and the second fastener further comprises:

a second transition part located between the second fastening part and the second connection part, and a second step formed between the second transition part and the second connection part.

11. The angle adjustment apparatus according to claim 10, wherein at least one third through hole is disposed in each of the first transition part and the second transition part; and at least one fourth through hole is disposed on each of one end of the first connection part away from the first transition part and one end of the second connection part away from the second transition part.

12. The angle adjustment apparatus according to claim 10, wherein at least one convex point is disposed on one of the first transition part and the second transition part, wherein at least one concave hole is disposed on the other of the first transition part and the second transition part, and wherein the convex point is cooperatively connected to the concave hole; or wherein at least one convex point and at least one concave hole are disposed on one of the first transition part and the second transition part, and wherein at least one concave hole and at least one convex point are disposed on the other of the first transition part and the second transition part, wherein a convex point on the first transition part is cooperatively connected to a concave hole on the second transition part, and wherein a concave hole on the first transition part is cooperatively connected to a convex point on the second transition part.

13. The angle adjustment apparatus according to claim 10, wherein a horizontal adjustment angle scale identifier is disposed at a position at which an outer edge of the first connection part is close to the linkage part or at a position at which an outer edge of the second connection part is close to the linkage part; and a vertical adjustment angle scale identifier is disposed at a position at which the linkage part of the rotation member is exposed from the first connection part or the second connection part.

14. The angle adjustment apparatus according to claim 1, wherein one of the male dovetail and the female dovetail is disposed on the adapter component, and the other of the male dovetail and the female dovetail is disposed on the angle adjustment component; and the male dovetail is cooperatively connected to the female dovetail.

15. The angle adjustment apparatus according to claim 14, wherein the adapter component comprises:

a handle and a mounting interface used to connect to an external device disposed on the adapter board.

* * * * *